United States Patent

Rodgers et al.

[11] Patent Number: 5,314,024
[45] Date of Patent: May 24, 1994

[54] ANGULAR AND RADIAL SELF-ALIGNING COUPLING

[75] Inventors: Tony A. Rodgers; Stephen J. Walker, both of Houston, Tex.

[73] Assignee: Cooper Industries, Inc., Houston, Tex.

[21] Appl. No.: 927,804

[22] Filed: Aug. 10, 1992

[51] Int. Cl.⁵ .............................................. E21B 17/02
[52] U.S. Cl. ...................................... 166/347; 285/24
[58] Field of Search ............... 166/355, 360, 344, 345, 166/347; 285/24, 27

[56] References Cited

U.S. PATENT DOCUMENTS

| | | | |
|---|---|---|---|
| 3,701,261 | 10/1972 | Nolan, Jr. | 285/24 X |
| 4,025,092 | 5/1977 | Wakefield | 285/110 X |
| 4,103,937 | 8/1978 | Wakefield | 285/110 |
| 4,252,347 | 2/1981 | Weinhold | |
| 4,436,326 | 3/1984 | Peaster | |
| 4,555,129 | 11/1985 | Daulin | 285/3 |
| 4,618,173 | 10/1986 | Dopyera et al. | |
| 4,659,116 | 4/1987 | Cameron | 285/27 |
| 4,747,622 | 5/1988 | Weinhold | |
| 4,781,405 | 11/1988 | Peaster | |

Primary Examiner—William P. Neuder
Attorney, Agent, or Firm—William E. Shull

[57] ABSTRACT

An angular and radial self-aligning coupling includes a first support block having a flow bore therethrough with an enlarged counterbore around one outlet of the flow bore. The enlarged counterbore forms a convex annular surface. A spherical seal plate also having a flow bore therethrough includes a concave surface on one side which matingly engages the convex annular surface of the support block. The spherical seal plate also has an annular bearing surface on its other side which engages a bearing face on a radial seal plate. The radial seal plate includes a stab counterbore on its other side. A second support block includes a flow bore therethrough and includes a piston which may be hydraulically actuated to an extended position. Upon actuation of the piston, the piston enters the stab counterbore and the radial seal plate and spherical seal plate automatically adjust for any radial or angular misalignment to allow the piston to stab within the stab counterbore.

8 Claims, 3 Drawing Sheets

ANGULAR AND RADIAL SELF-ALIGNING COUPLING

The present invention generally relates to telescoping joints and riser swivel tension rings on a drilling ship, and more particularly to a coupling for connecting the hydraulic lines, circulation lines, and choke and kill lines of the telescoping joint to gooseneck blocks and lines mounted on the riser swivel tension ring, and still more particularly to a connection which will allow the coupling of such lines upon angular and/or radial misalignment.

BACKGROUND OF THE INVENTION

Offshore wells are often drilled from a floating vessel, such as a drill ship or a semisubmersible. However, unlike a drilling platform, the floating vessel is in constant motion due to the waves and tides of the ocean. Thus, it is necessary that means be provided to compensate for the motion of the vessel with respect to the ocean floor into which the well is being drilled. An offshore oil well is drilled through a riser pipe extending from the ocean floor to the vessel. A telescoping joint is provided to connect the riser pipe to the diverter and related drilling equipment on board the floating vessel.

The telescoping joint includes a larger outer barrel located at the bottom of the joint and attached to the top of the last riser pipe extending from the ocean floor. A smaller inner barrel is located at the upper end of the telescoping joint and is telescopingly received within the lower and larger outer barrel. The telescoping joint allows the smaller inner barrel to slide up and down within the larger outer barrel and thereby compensates for the movement in the floating vessel which causes changes in the distance between the ocean floor and the vessel due to waves, tides, and other ship movement. A telescoping joint often has an extendable length of over 50 feet.

The larger outer barrel is landed in and supported by a riser swivel tension ring which includes tensioner line shackles having tensioning lines suspended from a compensator on the drawworks. Typically a diverter is mounted on top of the telescoping joint, which in turn is mounted on the riser, BOP stack, wellhead, and downhole casing, through which drilling is performed.

The telescoping joint also has mounted around the outer barrel a plurality of hydraulic lines, circulation lines, and choke and kill lines. Choke and kill lines are high pressure lines typically having an ID of about 3" and often having working pressures of about 15,000 psi. The hydraulic lines are lower pressure lines typically having an ID of about 2" and often have working pressures in the range of 5,000 psi. Circulation lines are lower pressure lines typically of about 4.5" ID and often have working pressures of approximately 5,000 psi. It is necessary to connect each of the hydraulic lines, circulation lines and choke and kill lines to corresponding fluid lines extending to drilling equipment on the floating vessel. To make these connections, female receptacles are mounted on the ends of each of the hydraulic, circulation and choke and kill lines and corresponding gooseneck connectors are mounted on the riser swivel tension ring. According to some prior art techniques, the gooseneck connectors include a block disposed on the riser swivel tension ring having a gooseneck stab which is received by the female receptacles on each of the hydraulic, circulation and choke and kill lines. The gooseneck stabs on the riser swivel tension ring are manually actuated to connect with the female receptacles on the telescoping joint. Such manual connections often require one to two days because of the extreme difficulty in lining up the gooseneck stabs with the female receptacles.

Because of the size and weight of the telescoping joint and the movement of the floating vessel, it is extremely difficult to adjust the seating of the telescoping joint within the riser swivel tension ring and obtain a perfect alignment between the gooseneck stabs, which are fixed in position in blocks on the riser swivel tension ring, and the female receptacles fixed on the telescoping joint. Misalignment occurs due to an angular misalignment and/or radial misalignment between the gooseneck blocks and stabs and the female receptacles. Angular misalignment can occur if the telescoping joint is cocked or tilted in the riser swivel tension ring. In such a case, the telescoping joint is not supported vertically within the riser swivel tension ring, thereby causing the axes of the female receptacles to be at an angle with the gooseneck stabs. Radial misalignment can occur upon the installation of the telescoping joint within the riser swivel tension ring where the tolerances are all stacked in a common direction causing the gooseneck blocks and female receptacles to be out of axial or radial alignment. The tolerances for the alignment of the gooseneck stab and female receptacle are very small such that a radial misalignment of a fraction of an inch or an angular misalignment of a fraction of a degree will prevent the ready connection of the lines. Because the gooseneck blocks are mounted and fixed to the riser swivel tension ring and the female receptacles are mounted and fixed to the telescoping joint, a fixed connection between the gooseneck blocks and female receptacles allows only a very small tolerance to alignment to achieve a successful connection.

In the general area of flexible couplings for pipe, various types of couplings have provided for misalignment. U.S. Pat. No. 4,781,405 teaches a coupling accommodating misalignment in three basic directions, i.e. axial, angular and radial. U.S. Pat. Nos. 4,252,347 and 4,747,622 include a handle on one portion of the coupling for angularly adjusting the connection between two pipes. U.S. Pat. No. 4,436,326 teaches a coupling allowing radial misalignment. U.S. Pat. No. 4,618,173 teaches a swivel coupling for an angular connection. However, these prior art pipe couplings are fixed conduit type swivel connections and are clamped together. None of these couplings are stab connections. Moreover, none of these couplings provides for a floating stab connection which is automatically correcting or self-adjusting in service to accommodate changes in the radial or angular alignment of the joined conduits.

SUMMARY OF THE INVENTION

The present invention includes an angular and radial self-aligning coupling mounted on the telescoping joint and riser swivel tension ring. The coupling includes a first support block having a flow bore therethrough and which is mounted on one of the hydraulic, circulation or choke and kill lines whereby one outlet of the flow bore is in communication with the line. The first support block also includes an enlarged counterbore around the other outlet of the flow bore forming a convex annular surface. A spherical seal plate having a bore therethrough is aligned with the flow bore and includes an annular bearing surface on one side and a concave annular surface on its other side. The concave annular surface matingly engages the convex annular surface of the first support block to form an angular joint. A radial seal plate includes a bearing face on one side and a stab counterbore on its other side. The inner bearing face of the radial seal plate engages the outer bearing surface of the spherical seal plate to form a radial joint. The annular bearing surface of the spherical seal plate has a larger outer diameter than the outer diameter of the bearing face of the radial seal place, thereby allowing the bearing face to have multiple radial alignments with the bearing surface. A retaining flange is provided to mount the spherical seal plate to the first support block, and a retaining ring is provided to mount the radial plate to the spherical plate.

A second support block is mounted on the riser swivel tension ring and also includes a flow bore therethrough. One outlet of the flow bore is connected to the gooseneck. The second support block also includes a cylinder having a piston reciprocably mounted therein. The piston includes a portion of the flow bore therethrough.

Upon connection, the piston is hydraulically actuated and moved to an extended position from the cylinder to be received within the stab counterbore of the radial seal plate of the first support block for communicating the flow bores. As the piston enters the stab counterbore, the angular joint and radial joint adjust to any misalignment, i.e., they move to aligned position, and allow the piston to stab within the stab counterbore even though the counterbore and piston initially are not angularly or radially aligned.

Other objects and advantages of the present invention will appear from the following description.

BRIEF DESCRIPTION OF THE DRAWINGS

For a detailed description of a preferred embodiment of the invention, reference will now be made to the accompanying drawings wherein.

DESCRIPTION OF A PREFERRED EMBODIMENT

Figure 1:
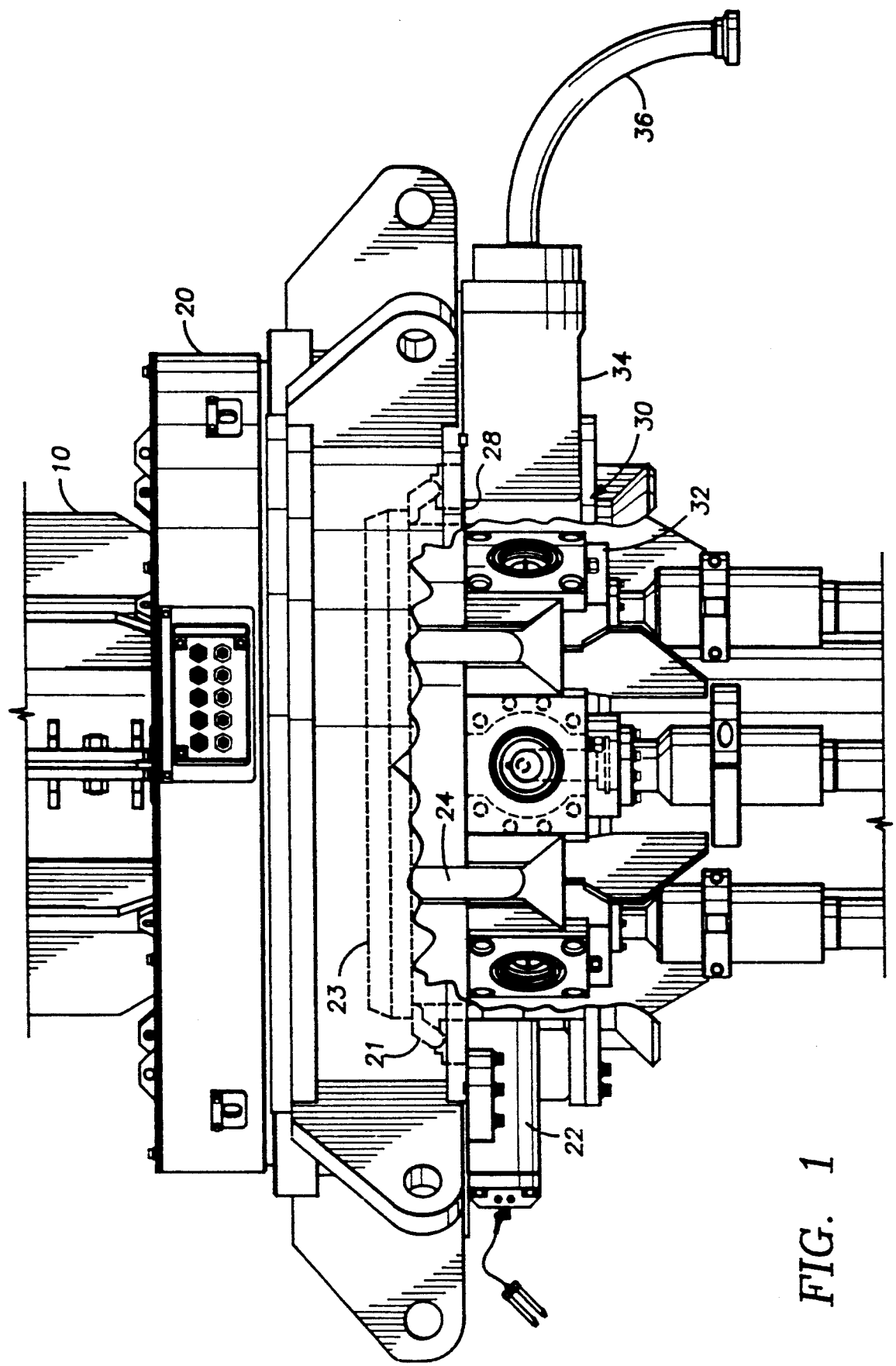
FIG. 1 is a side elevational view of the telescoping joint landed within the riser swivel tension ring.
Figure 2:
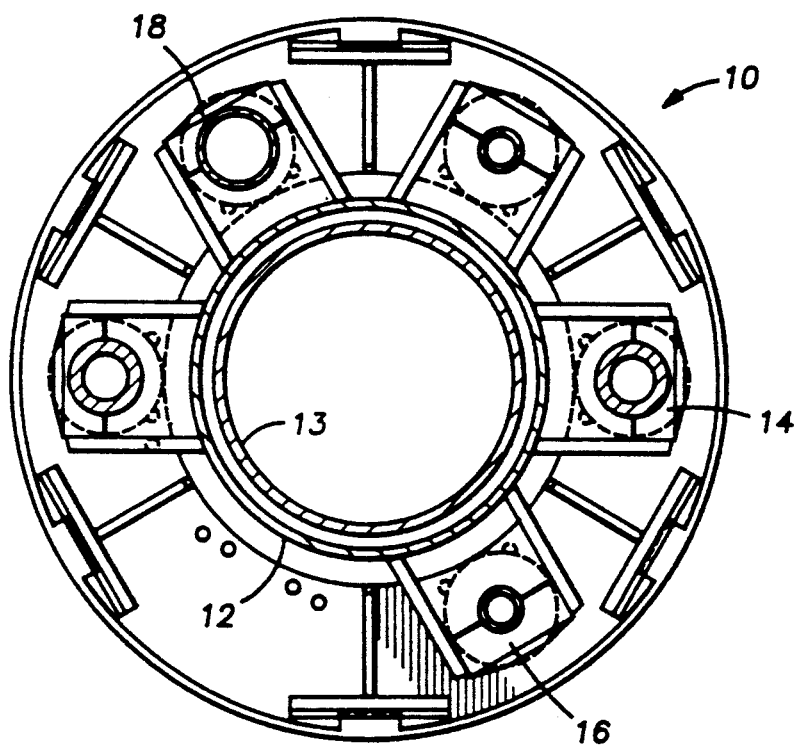
FIG. 2 is a horizontal cross-section at the lower end portion of the telescoping joint, showing the hydraulic, circulation, and choke and kill lines.

Referring initially to FIGS. 1 and 2, there is shown a telescoping joint 10 landed and supported within a riser swivel tension ring 20. Telescoping joint 10 includes a lower outer barrel 12 which is connected to the top of the last riser pipe extending to the surface from the ocean floor. An inner barrel 13 is telescopingly received within barrel 12. A plurality of hydraulic lines, circulation lines, and choke and kill lines are mounted circumferentially about the exterior of the outer barrel of telescoping joint 10. Typically, the telescoping joint 10 includes two choke and kill lines 14 having a working pressure of about 15,000 psi, two hydraulic lines 16 having a working pressure of about 5,000 psi, and a circulation line 18 having a working pressure of approximately 5,000 psi. A sixth line may be run but typically is left blank down the telescoping joint 10. Since the coupling of the present invention may be used with any of the choke and kill lines 14, hydraulic lines 16, and circulation line 18, they will hereinafter be referred to as a telescoping joint fluid line 26.

The riser swivel tension ring 20, hereinafter referred to as the RST ring, includes a support ring 21 for supporting flange 23 of the telescoping joint 10 within RST ring 20. A hydraulic locking pin 22 engages a locking groove 24 in telescoping joint 10 for locking telescoping joint 10 within RST ring 20.

The angular and radial self-aligning coupling 30 of the present invention includes a telescoping joint body or support block 32 mounted to the top of fluid line 26, as hereinafter described, and a RST ring body or support block 34 mounted to a flange 28 of RST ring 20. A gooseneck 36 is attached to one end of RST ring support block 34. Flexible auxiliary fluid lines are connected to gooseneck 36 and extend to the appropriate oilfield equipment relating to a particular telescoping joint fluid line to which the gooseneck 36 is connected, such as a hydraulic, circulation, or choke and kill line. Loops are provided in the flexible auxiliary fluid lines to accommodate for the changing ship-to-stack distance.

Figure 3B:
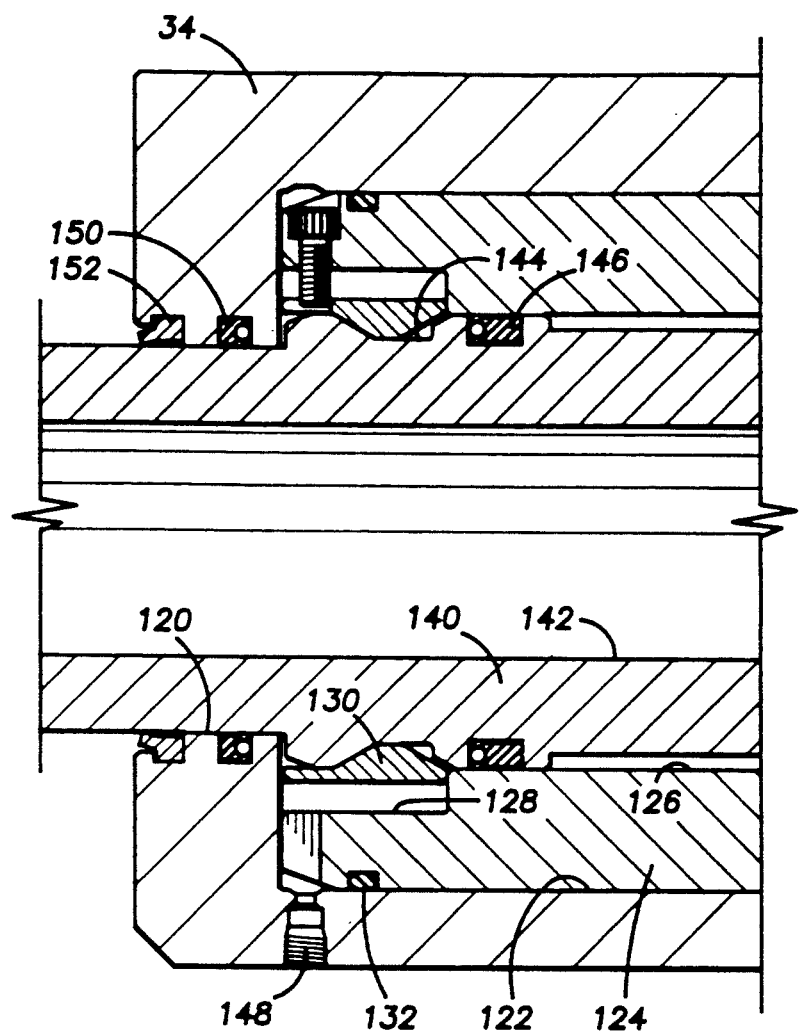
FIGS. 3A and 3B are enlarged cross-sectional side elevational views of the angular and radial self-aligning coupling of the present invention in the stabbed and connected position.
Figure 3A:
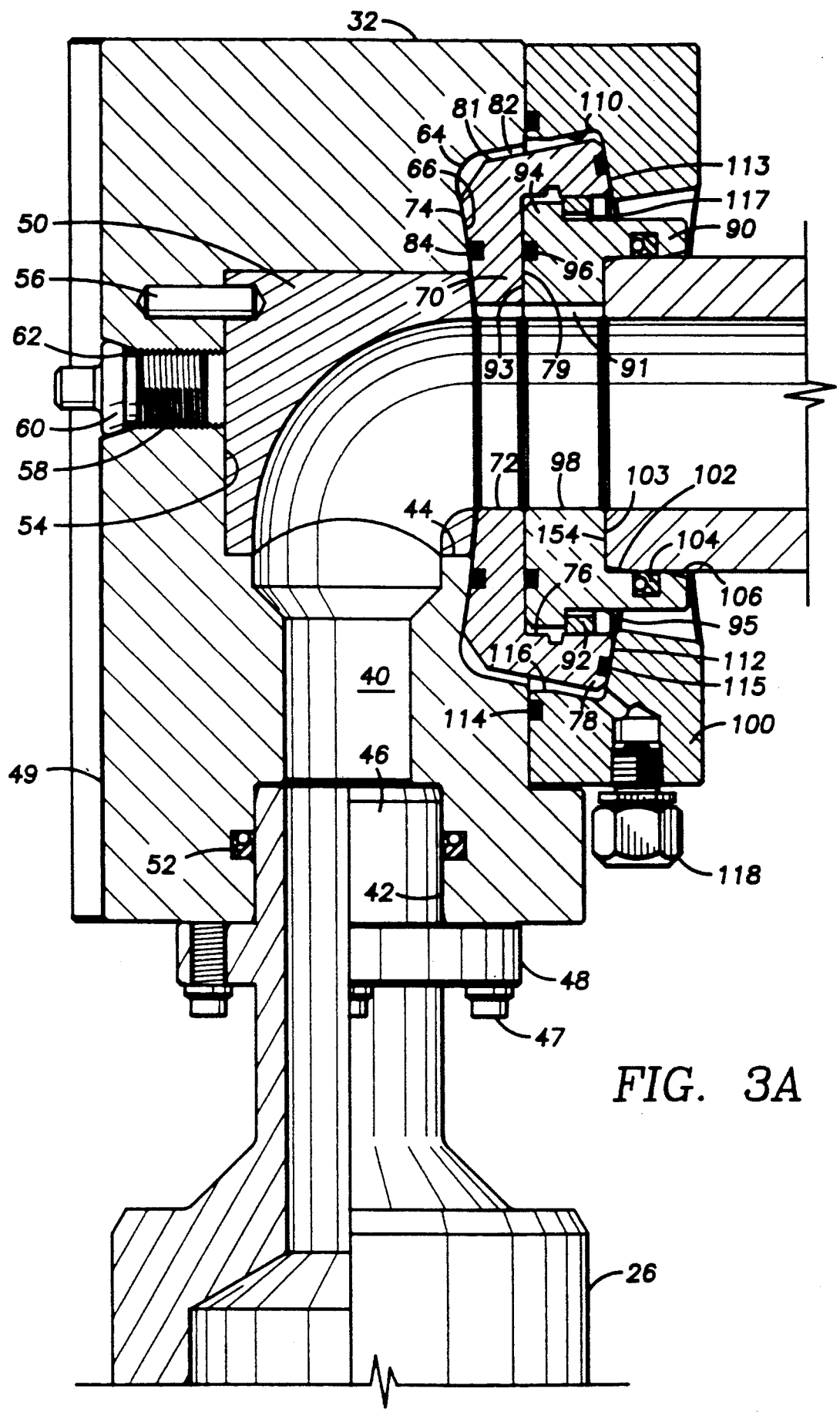

Referring now to FIGS. 3A and 3B, the angular and radial self-aligning coupling 30 is shown in the stabbed or coupled position. FIG. 3B shows the structure extending integrally to the right of FIG. 3A. The telescoping joint support block 32 includes a flow bore 40 having a bottom outlet port 42 and a side outlet port 44. Flow bore 40 forms an elbow or 90° turn allowing the fluid to pass vertically up into support body 32 and then to one side for flowing into gooseneck 36, or in the opposite direction from outlet port 44 to bottom port 42. Bottom outlet port 42 has an enlarged counterbore for receiving the upper end 46 of fluid line 26. Sealing means 52 are provided in an annular groove extending around the counterbore of outlet port 42 for sealingly engaging the external surface of end 46 of fluid line 26. Upper end 46 includes a flange 48 attached to the lower end of support block 32 by fastening means such as bolts 47 threaded into threaded apertures in the bottom of support block 32.

A stellite target or wear insert 50 is housed within a central cavity 54 of support block 32 and forms the elbow of flow bore 40 between outlet ports 42 and 44. That portion of flow bore 40 extending through stellite target 50 and outlet port 44 may have an enlarged diameter. Stellite target 50 is inserted into cavity 54 through outlet port 44. Anti-rotation pin 56 is provided in cooperating apertures in stellite target 50 and support block 32 so as to align the elbow of flow bore 40 with outlet ports 42, 44 and also to prevent any rotation of stellite target 50 within cavity 54. The target 50, which is made of stellite materials, provides a wear resistant surface around the 90° turn of flow bore 40 to resist wear due to the force of the impinging fluid passing through the elbow of flow bore 40 at high flow rates and under high pressures. A threaded aperture 58 is provided through support block 32 into cavity 54 to receive a knockout plug 60 which can be removed to drive stellite target 50 out of central cavity 54 and through outlet port 44 to remove stellite target 50 from cavity 54, for example to replace it with a new one. Sealing means 62 is provided in a groove extending around knockout pin 60 to sealingly engage support block 32.

Support block 32 further includes a counterbore 64 coaxially surrounding outlet port 44. Counterbore 64 with its larger diameter forms an outwardly facing, convex annular surface 66. Convex annular surface 66 forms a part of an angular alignment means hereinafter described.

A spherical seal plate 70 is disposed within counterbore 64. Spherical seal plate 70 has a bore 72 aligned with flow bore 40 and includes an inwardly facing, bottom concave surface 74 which matingly engages outwardly facing, convex annular surface 66 to form an angular alignment means. Spherical seal plate 70 also includes a counterbore 76 which forms an annular rim 78 and an outwardly facing, annular bearing surface 79. A sealing means 84 is provided in an annular groove in concave surface 74 to sealingly engage convex annular surface 66.

A radial seal plate 90 is disposed within counterbore 76 of spherical seal plate 70 and includes an inwardly facing bearing face 93 engaging annular bearing surface 79. Radial seal plate 90 is retained within counterbore 76 of spherical seal plate 70 by a threaded retainer ring 92 which threadingly engages threads on the interior of counterbore 76 and bears against annular flange 94 extending radially around the inner periphery of radial seal plate 90. A sealing means 96 is provided in an annular groove in the bottom bearing face 93 of radial seal plate 90 for sealingly engaging the annular bearing surface 79 of spherical seal plate 70.

Radial seal plate 90 further includes a bore 98 therethrough aligned with bore 72 and flow bore 40. Bore 98 includes an enlarged counterbore 102 forming an outwardly facing, annular shoulder 103. Counterbore 102 includes an annular groove which receives a sealing means 104 and also has an entrance 106 which is chamfered to an enlarged diameter.

Spherical seal plate 70 and radial seal plate 90 include an aligned anti-rotation groove 91 passing therethrough adjacent bores 72, 98, to facilitate engagement by a tool (not shown) to install or remove ring 92.

Spherical seal plate 70 and radial seal plate 90 are secured to support block 32 by a retaining flange 100. For the high pressure lines, retaining flange 100 is preferably secured to the support block 32 by bolts extending through the support block from the back face thereof into the inner face of the retaining flange. For the lower pressure lines, retaining flange 100 is preferably secured to the support block 32 by bolts extending through the retaining flange from its outer face, into the support block. Retaining flange 100 includes a counterbore 110 which has an opening sized to receive the annular rim 78 of spherical seal plate 70. The counterbore 110 forms an annular shoulder 112 which abuts the peripheral surface 113 of rim 78. An annular groove in the peripheral surface 113 houses a seal means 115 to prevent debris from passing into counterbore 110. Annular shoulder 112 extends and projects partially over retaining nut 92. Retaining flange 100 also includes an inner annular groove for housing a seal 114 which sealingly engages the support block 32 to prevent debris from entering the connection. Retaining flange 100 includes a grease fitting 118 for supplying the annular clearance area 82, 116 with grease.

An angular alignment means is formed by convex annular surface 66 and concave annular surface 74 of support block 32 and spherical seal plate 70, respectively. Annular clearance area 82, 116 extends around the outer circumferential surface 81 of rim 78 of spherical seal plate 70 between such outer surface 81 and the circumferential walls of counterbores 64 and 110 of support block 32 and retaining flange 100, respectively. This annular clearance area 82, 116 allows the concave surface 74 of spherical seal plate 70 to slidingly move over convex annular surface 66 of support block 32. This movement may be in any direction until the outer surface 81 of spherical seal plate 70 engages the circumferential walls of counterbores 64, 110. Clearance 82, 116 allows spherical seal plate 70 to shift in any direction to accommodate up to about one degree of angular misalignment between the flow axes of support blocks 32, 34.

A radial alignment means is formed between spherical seal plate 70 and radial seal plate 90. The diameter of counterbore 76 is greater than the outer diameter of radial seal plate 90 such that annular bearing surface 79 is wider than bearing face 93. Thus, radial seal plate 90 may slidingly move within counterbore 76 in any direction. Such movement is limited by the clearance 117 between retainer ring 92 and the outer surface 95 of radial seal plate 90. The clearance 117 will allow radial seal plate 90 to shift at least about 0.118 inches in any direction within counterbore 76.

RST ring support block 34 includes a reduced diameter, restricted opening 120 and an enlarged diameter internal bore 122. A removable, cylindrical insert 124 is slidingly received within enlarged bore 122. Insert 124 forms a cylinder 126 therethrough with a counterbore 128 in one end for receiving a split locking keeper ring 130. An annular groove extends around the outer circumference of insert 124 for housing a sealing means 132 which sealingly engages support block 34. Cylindrical insert 124, and the piston housed within it (see below), may be replaced by sliding insert 124 from bore 122 of block 34 and removing the insert 124 from support block 34 for replacement.

A stab piston 140 is reciprocably disposed within cylinder 126 of insert 124. Piston 140 includes a flow bore 142 for alignment with flow bore 40 of telescoping joint support block 32. Piston 140 includes a lock ring groove 144 around its outer periphery for receiving locking keeper ring 130 in the extended and stabbed position. Piston 140 also includes an outer annular groove for receiving a sealing means 146 which sealingly engages the inner circumferential wall of cylinder 126 of insert 124. Piston 140 is hydraulically actuated through application of fluid pressure through hydraulic ports at each end of support block 34, such as shown at 148.

The reduced diameter opening 120 of support block 34 includes a first annular groove housing sealing means 150 and a second annular groove housing a wiper ring 152. Sealing means 150 and wiper ring 152 engage the outer circumferential surface of piston 140.

Various different sealing means are used in the coupling of the present invention. Sealing means 84 and 96 are preferably high compression face seals for withstanding the high pressures of the fluids passing through flow bores 40, 142. Sealing means 52, 104, 146, and 150 preferably are high/low temperature seals such as the Parker "poly-pack" seal made of carboxylated nitrile. Sealing means 62, 115, 114, and 132 are preferably elastomeric O-ring seals, which may also be made of carboxylated nitrile, to seal out debris. These seals need not be high pressure seals.

In operation, piston 140 is hydraulically actuated within cylinder 126 to move to the extended and coupled position. The terminal end 154 of piston 140 engages the chamfered entrance 106 of radial seal plate 90. As terminal end 154 is received within counterbore 102 of radial seal plate 90, spherical seal plate 90 will rotate angularly on convex surface 74 to compensate for any angular misalignment between the axes of piston 140 and flow bore 40. At the same time, radial seal plate 90 moves in any one of the radial directions with respect to the axis of flow bore 40 to compensate for any radial misalignment between counterbore 102 and piston 140. Any radial and/or angular misalignment during the stabbing of piston 140 into counterbore 102 will automatically cause the angular alignment means and radial alignment means to rotate and self center counterbore 102 on piston 140. Thus, the coupling of the present invention provides a floating stab counterbore 102 which automatically self-centers with piston 140 to accommodate any radial or angular misalignment between piston 140 and counterbore 102. Any angular misalignment up to about one degree will be accommodated by the angular alignment means and any radial misalignment up to about 0.118 inches will be accommodated by the radial alignment means of the present invention.

Further, the coupling of the present invention continues to self-adjust and align during service. To a limited extent dictated by the clearances and mobility in the joints, any relative movement between telescoping joint 10 and RST ring 20 will be accommodated by the angular adjustment means and radial adjustment means. Thus, the coupling of the present invention continuously and automatically self aligns to accommodate, within limits, any angular or radial misalignment between telescoping joint 10 and RST ring 20. It should be appreciated that piston 140 may be hydraulically actuated at port 148 to return to its retracted position within cylinder 126.

While a preferred embodiment of the invention has been shown and described, modifications thereof can be made by one skilled in the art without departing from the spirit of the invention.

We claim:

1. A coupling for connecting a first fluid line to a second fluid line, comprising:
   - a first connector having a first flow bore therethrough with an outlet, said first flow bore being in fluid communication with the first fluid line, said first connector having a convex annular surface extending around said outlet;
   - a first plate mounted on said first connector and having an aperture therethrough communicating with said first flow bore, said first plate having an annular concave surface matingly engaging said convex annular surface, said first plate also having a bearing surface;
   - a second plate disposed on said first plate and having a hole therethrough in fluid communication with said first flow bore, said second plate having a bearing face engaging said bearing surface, said bearing surface having a larger outer diameter than said bearing face, said second plate also having a stab bore communicating with said hole;
   - a second connector having a second flow bore therethrough and a cylindrical member having a portion of said second flow bore therein and moveable to an extended position to be received within said stab bore for communicating said second flow bore with said first flow bore, whereby upon angular misalignment of said cylindrical member with said first flow bore, said first plate slides angularly on said convex surface for facilitating angular alignment, and upon radial misalignment of said cylindrical member with said first flow bore, said second plate moves radially on said bearing surface of said first plate for radially aligning said cylindrical member with said first flow bore.

2. A coupling mounted on a telescoping joint suspended within a riser swivel tension ring for connecting a fluid line on the telescoping joint to an auxiliary fluid line on said riser swivel tension ring, comprising:
   - a first body having a first flow bore therethrough forming first and second ports, said first body being adapted for mounting said first port to the fluid line;
   - said first body having an enlarged counterbore around said second port, said counterbore forming a convex surface around said first flow bore at said second port;
   - a first plate having a bore therethrough aligned with said first flow bore and having an annular bearing surface on one side and a concave surface on another side, said concave surface matingly engaging said convex surface and being slidable thereon to a limited extent to form an angular joint;
   - a second plate having a bore therethrough and aligned with said first flow bore, said second plate having a bearing face on one side and a stab counterbore on another side, said bearing face engaging said bearing surface and being radially movable thereon to a limited extent to form a radial joint;
   - a second body mounted on the riser swivel tension ring and having a cylinder receiving a piston reciprocably mounted therein, said piston having a second flow bore therethrough; and
   - said piston having a stabbing position wherein said piston is received within said stab counterbore for communicating said first and second flow bores, said angular joint and radial joint allowing the stabbing of said piston within said stab counterbore where the piston is not angularly or radially aligned with said stab counterbore.

3. The coupling of claim 2 further including means for sealing said first and second plates with respect to each other and to said first body.

4. The coupling of claim 2 further including means for retaining said first and second plates on said first body.

5. The coupling of claim 4 wherein said retaining means includes a retainer flange disposed on said first body and engaging said first plate for retaining said first plate on said first body within said enlarged counterbore, and a retainer ring disposed on said first plate and engaging said second plate for mounting said second plate on said first plate and permitting limited movement of said second plate on said first plate in a radial direction.

6. The coupling of claim 2 wherein said first body includes an enlarged cavity around said first flow bore, and further including a wear insert mounted within said enlarged cavity and having a bore therethrough aligned with said first flow bore.

7. The coupling of claim 2 wherein said second body further includes a cylindrical insert mounted within said cylinder, said cylindrical insert having a bore for receiving said piston.

8. The coupling of claim 2, further including means for maintaining said piston in said stabbing position.

* * * * *